United States Patent
Shaw et al.

(10) Patent No.: US 11,295,183 B1
(45) Date of Patent: Apr. 5, 2022

(54) DEPLOYMENT OF DIGITALLY SIGNED CUSTOM COLOR TABLE TO IMAGING DEVICE

(71) Applicant: Hewlett-Packard Development Company, L.P., Spring, TX (US)

(72) Inventors: Mark Q. Shaw, Boise, ID (US); Timothy P. Blair, Boise, ID (US); George H. Kerby, Boise, ID (US); Cooper G. Urie, Boise, ID (US); Shane R. Konsella, Boise, ID (US); Todd J. Harris, Boise, ID (US); David Hatton, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/333,383

(22) Filed: May 28, 2021

(51) Int. Cl.
| | |
|---|---|
| G06K 15/02 | (2006.01) |
| H04N 1/44 | (2006.01) |
| G06K 15/00 | (2006.01) |
| H04N 1/60 | (2006.01) |
| G06F 3/12 | (2006.01) |

(52) U.S. Cl.
CPC ......... *G06K 15/027* (2013.01); *G06F 3/1227* (2013.01); *G06F 3/1292* (2013.01); *G06K 15/1802* (2013.01); *G06K 15/183* (2013.01); *G06K 15/4095* (2013.01); *H04N 1/4426* (2013.01); *H04N 1/60* (2013.01); *H04N 1/6019* (2013.01); *G06F 3/1208* (2013.01); *H04N 1/603* (2013.01); *H04N 1/6052* (2013.01)

(58) Field of Classification Search
None
See application file for complete search history.

(56) References Cited

U.S. PATENT DOCUMENTS

| | | | | |
|---|---|---|---|---|
| 2007/0035766 | A1* | 2/2007 | Yamamura | H04L 63/0428 358/1.15 |
| 2008/0209419 | A1* | 8/2008 | Maeda | G06F 3/1229 718/100 |
| 2011/0122439 | A1* | 5/2011 | Sato | G06F 21/608 358/1.15 |
| 2011/0188063 | A1* | 8/2011 | Nuggehalli | G06F 3/1231 358/1.13 |
| 2013/0148145 | A1* | 6/2013 | Salgado | G06F 3/1205 358/1.13 |
| 2015/0178021 | A1* | 6/2015 | Shimizu | G06F 3/1204 358/1.9 |
| 2020/0314288 | A1* | 10/2020 | Shaw | H04N 1/6058 |

* cited by examiner

*Primary Examiner* — Miya J Williams
(74) *Attorney, Agent, or Firm* — Michael A Dryja

(57) ABSTRACT

A user device constructs a custom color table for an imaging device and transmits the custom color table to a computing device. The computing device digitally signs the custom color table constructed at the user device. The digitally signed custom color table is deployed to the imaging device. The imaging device processes an image using the using the digitally signed custom color table.

20 Claims, 5 Drawing Sheets

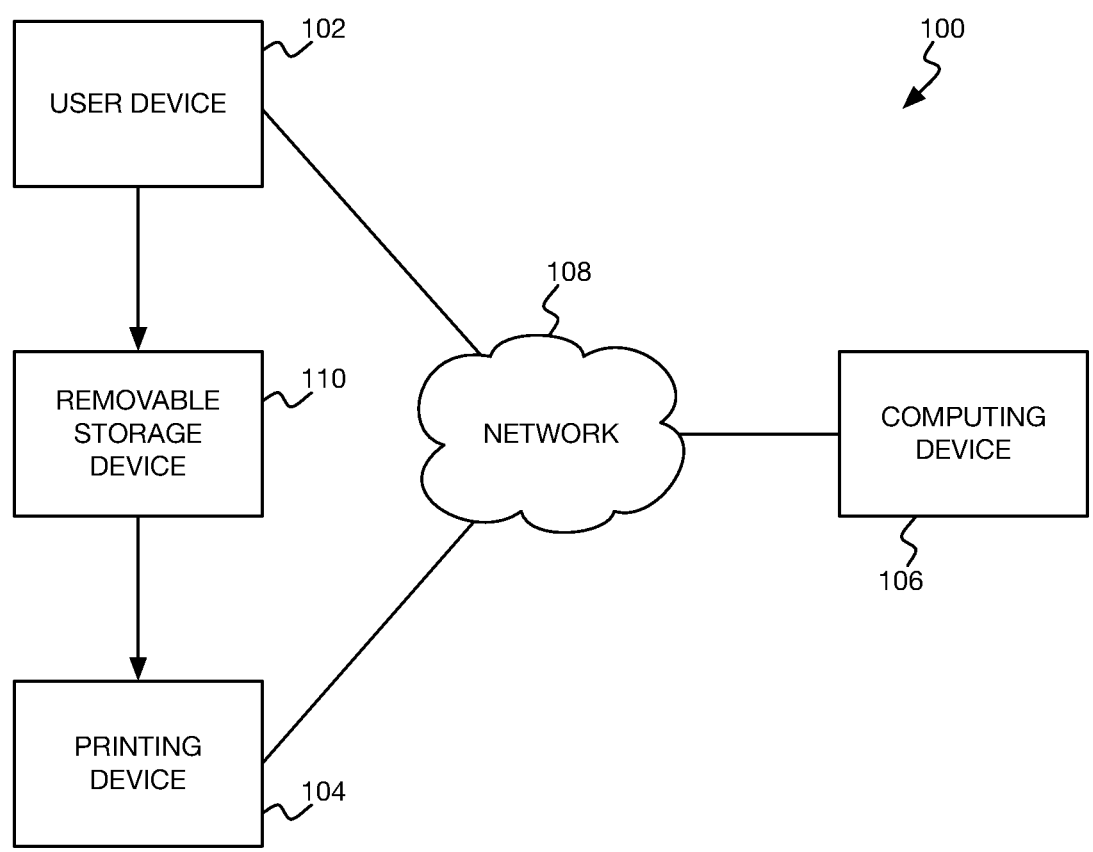

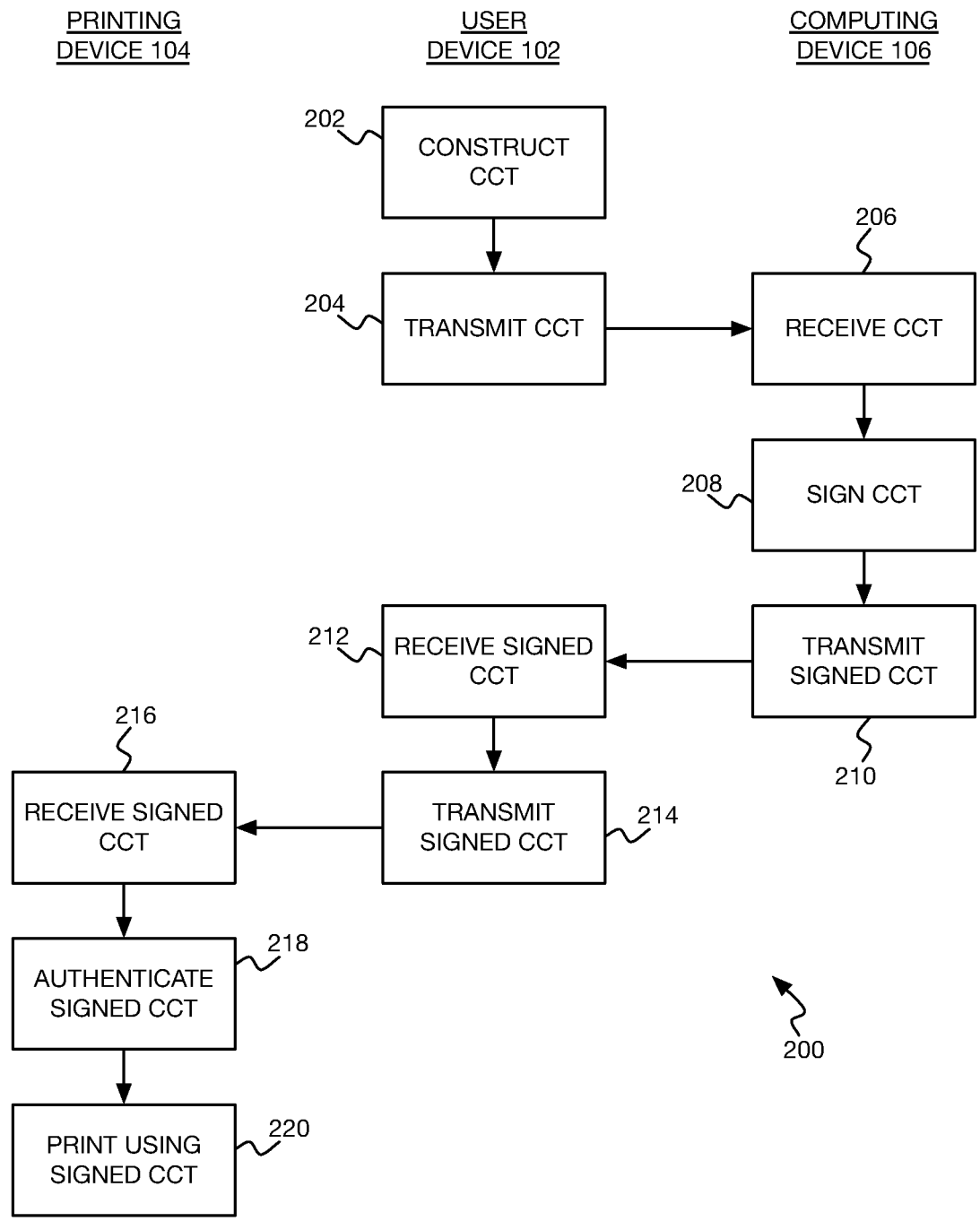

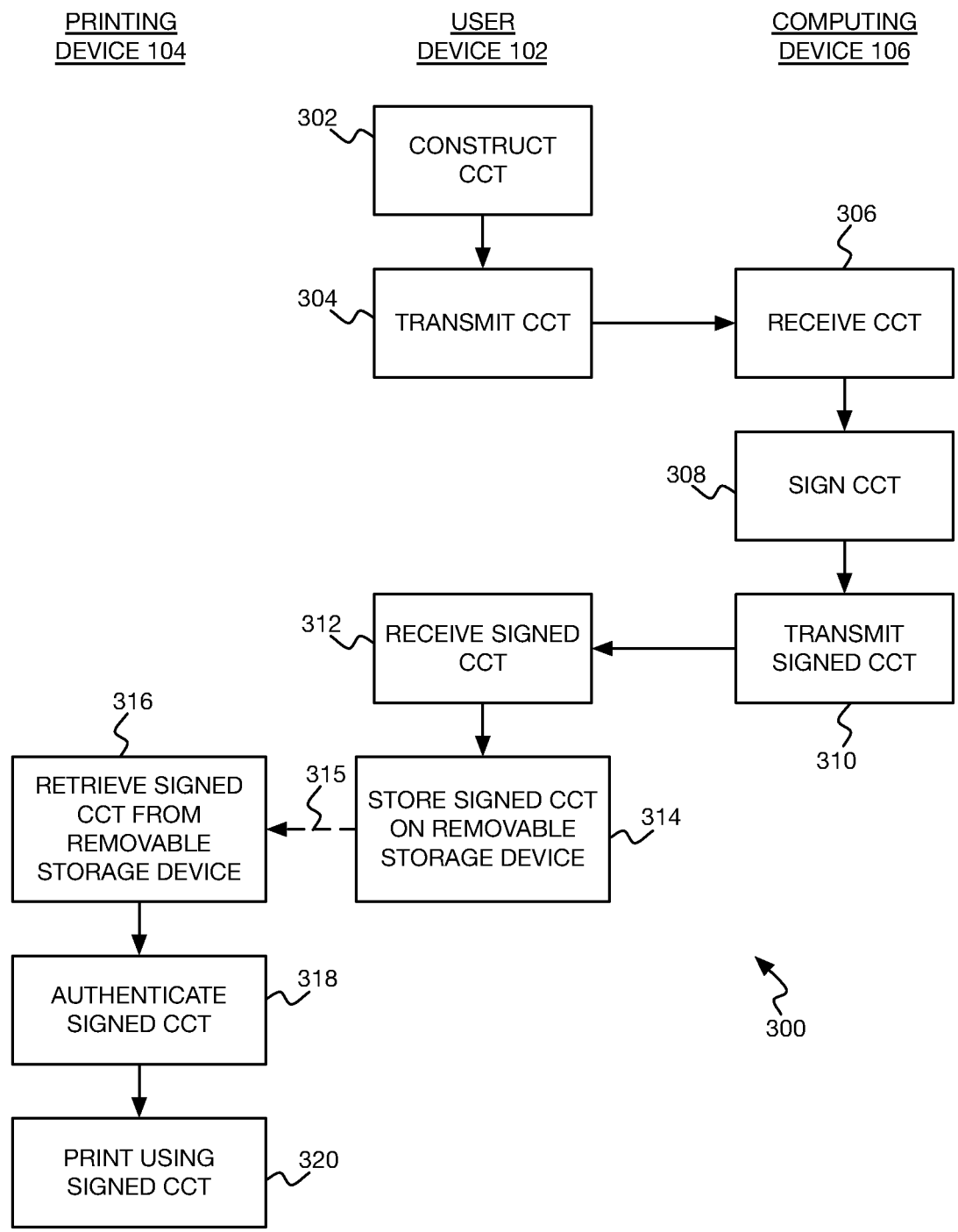

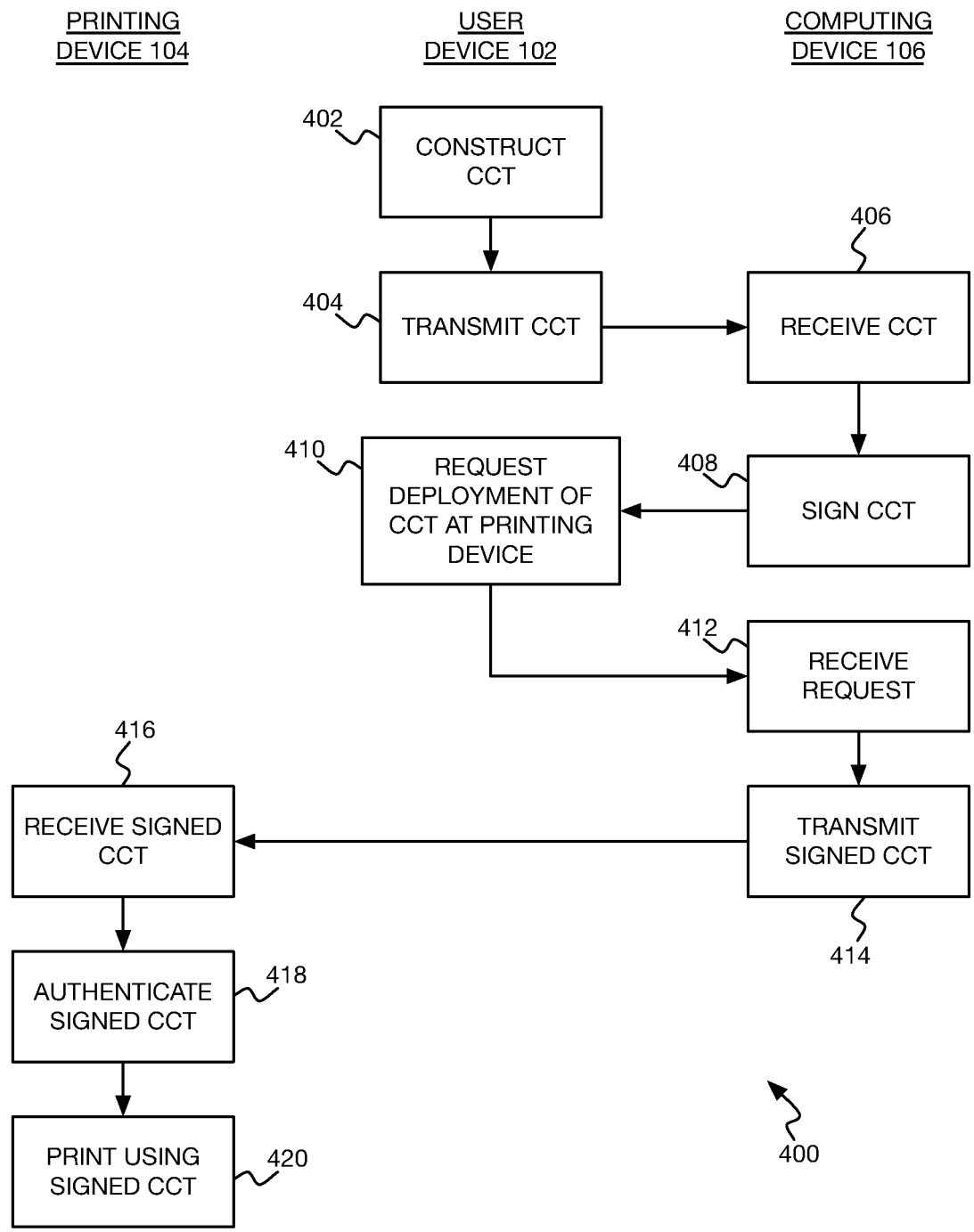

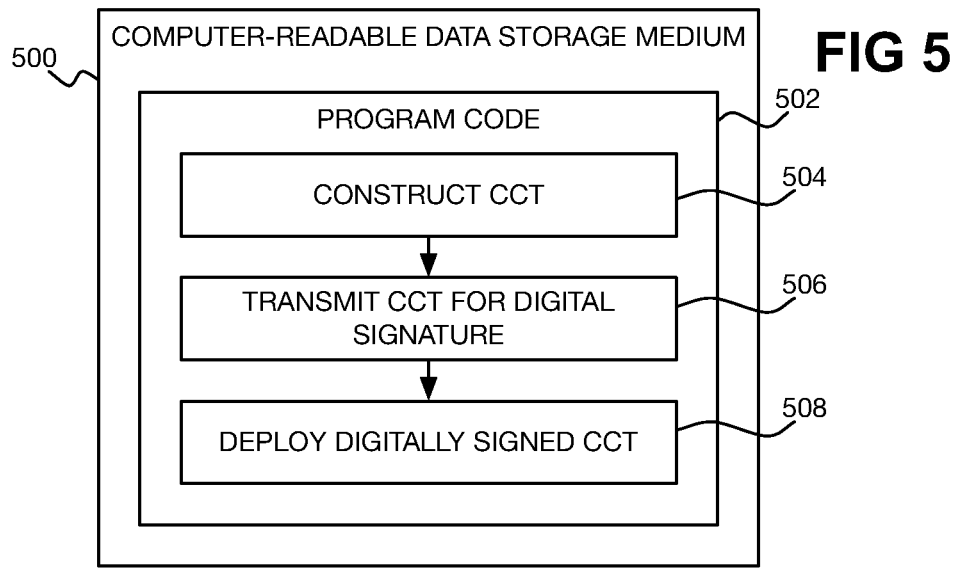
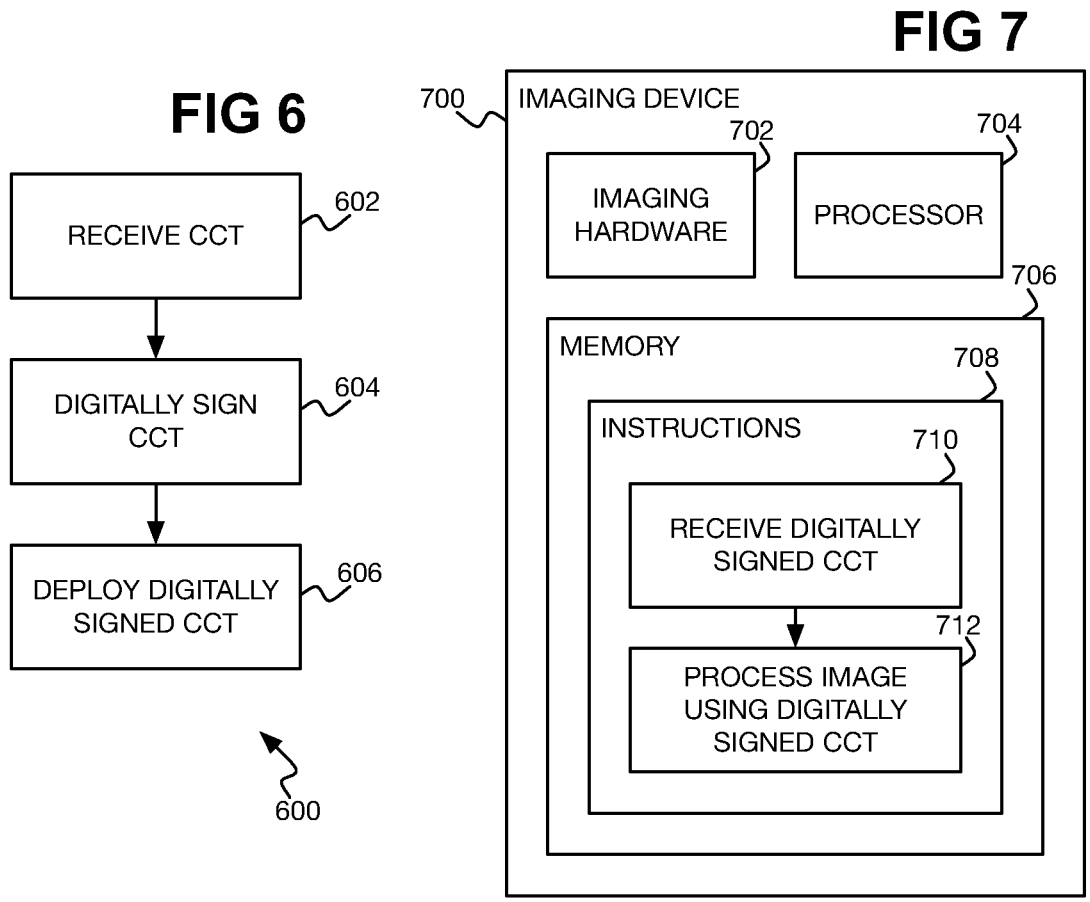

DEPLOYMENT OF DIGITALLY SIGNED CUSTOM COLOR TABLE TO IMAGING DEVICE

BACKGROUND

Printing devices can use a variety of different technologies to form images on media such as paper. Such technologies include dry electrophotography (EP) and liquid EP (LEP) technologies, which may be considered as different types of laser and light-emitting diode (LED) printing technologies, as well as inkjet-printing technologies and three-dimensional (3D) printing technologies. Printing devices deposit print material, such as colorant like toner and ink (which can include other printing fluids or material as well).

BRIEF DESCRIPTION OF THE DRAWINGS

FIG. 1 is a diagram of an example system in which a digitally signed custom color table can be deployed to a printing device.

FIG. 2 is a diagram of an example process for deployment of a digitally signed custom color table to a printing device directly from a user device at which the table was constructed (and indirectly from a computing device that digitally signed the table).

FIG. 3 is a diagram of another example process for deployment of a digitally signed custom color table to a printing device directly from a user device at which the table was constructed (and indirectly from a computing device that digitally signed the table).

FIG. 4 is a diagram of an example process for deployment of a digitally signed custom color table to a printing device directly from a computing device that digitally signed the table (and indirectly from a user device at which the table was constructed).

FIG. 5 is a diagram of an example non-transitory computer-readable data storage medium storing program code for execution by a user device to deploy, to an imaging device, a digitally signed custom color table that was constructed at the user device.

FIG. 6 is a flowchart of an example method performed by a computing device that digitally signs a custom color table for deployment to an imaging device.

FIG. 7 is a block diagram of an example imaging device to which a digitally signed custom color table is deployed.

DETAILED DESCRIPTION

As noted in the background, printing devices can form images on media by depositing print material on the media. One or multiple color tables, or color maps, can be applied to a source image prior to printing to ensure that colors of the printed image accurately match the colors of the source image. Color tables may be printing device-independent or -dependent, but for maximum color fidelity, device-dependent color tables are usually employed in addition to or in lieu of device-independent color tables.

A printing device may be loaded with default color tables that provide good color matching for printing the majority if not vast majority of images. However, in certain situations, a custom color table may be constructed to ensure the best possible color matching when printing particular types of source images using particular printing devices. A custom color table may be constructed by tuning or adjusting an existing or default color table, or in another manner.

For example, a support engineer of the manufacturer of a printing device, or a skilled user of an authorized partner of the manufacturer, may work with a printing service provider so that specific types of images that the provider is printing on behalf of a customer have color accuracy to the satisfaction of the customer. The custom color table construction process can be laborious, and involve iterative adjustment before the table provides for satisfactory color accuracy. The support engineer or other skilled user may travel onsite to the printing service provider to work directly with the customer in this respect.

In some cases, once a custom color table has been constructed, the table has to be deployed to the printing device in question so that the printing device can then use the custom color table for printing images. However, security of network-connected devices including printing devices has become of paramount importance in many environments. Therefore, printing devices may be configured so that they are not permitted to load unauthorized files that may potentially compromise the security of the devices. Such heightened security can prevent constructed custom color tables from being deployed to printing devices.

Techniques described herein overcome these and other issues. The described techniques provide for deployment of digitally signed custom color tables to printing devices. The printing devices can therefore authenticate the custom color tables prior to usage, and not use custom tables that fail authentication. The custom color tables can be digitally signed with the private cryptographic key of the manufacturer of the printing device. The described techniques ensure that the manufacturer's private key remains secure during digital signature and subsequent deployment of the custom color tables, however.

The techniques are described herein primarily in relation to a printing device in which a custom color table is used for printing. For instance, a custom color table may be applied to an image and then the resulting custom color table-applied image printing. However, the techniques are more generally applicable to other types of imaging devices as well. For example, an imaging device may be or include a scanning device that optically captures an image. A custom color table may thus be applied to the captured image prior to the image being printed, stored on a storage device, or transferred via email or in another manner. An imaging device can thus have printing and/or scanning functionality, including printing but not scanning functionality or scanning but not printing functionality.

FIG. 1 shows an example system 100. The system 100 includes a user device 102, a printing device 104, and a computing device 106. The user device 102 may be a computing device, such as a desktop, laptop, or notebook computer, or another type of computing device, of an authorized user that is responsible for construction of a custom color table for deployment at the printing device 104. This user may be an authorized support engineer of the manufacturer of the printing device 104, an authorized skilled user of a partner of the manufacturer, or another authorized user. The user is authorized in that the user is permitted to deploy custom color tables to the printing device 104.

The printing device 104 may be a standalone printer or an all-in-one (AIO) printing device combining other functionality in addition to printing functionality, such as scanning, copying, and faxing functionality, for instance. The printing device 104 may be an inkjet printing device, a laser printing device, or another type of printing device. The printing device 104 is able to have custom color tables loaded therein (i.e., deployed thereto) for usage when printing images on media like paper.

The computing device 106 can be a server computing device, and is operated by or on behalf of the manufacturer of the printing device 104. In the example, the computing device 106 is communicatively connected to the printing device 104 over the network 108, which may be or include the Internet, an intranet, an extranet, a wide-area network, a local-area network, a wireless network, a wired network, and so on. In the example, the computing device 106 may manage the printing device 104 for a printing service provider that uses the device 104 to print on behalf of customers of the provider.

The user device 102 may be connected to the printing device 104 via the same or different network 108. For instance, the printing device 104 may be located at the location of a printing service provider, whereas the computing device 106 may be located at the location of a data center of the manufacturer of the device 104. Therefore, the printing device 104 and the computing device 106 may communicate over a network 108 that includes the Internet. If the user device 102 is also located remotely to the location of the printing device 104, the user device 102 may similarly communicate with the printing device 104 over a network 108 that includes the Internet.

However, if the user of the user device 102 has traveled to the location of the printing device 104, then the user device 102 may communicate with the printing device 104 over a network 108 that includes a local-area network of the printing service provider at this location. The user device 102 may instead directly communicate with the printing device 104 in a wireless or wired manner, such as over a universal serial bus (USB) connection. In one implementation, then, the printing device 104 may not be communicatively connected to any network 108.

By comparison, in another implementation, the printing device 104 may be communicatively connected to just a local such network 108 at the printing service provider's location and thus to the user device 102 when at this location and not to a network 108 that includes the internet. In still another implementation, however, the printing device 104 may as noted above be communicatively connected to a network 108 that may include the Internet such that the computing device 106 can also communicate with the printing device 104. Different techniques described herein can be employed to deploy digitally signed custom color tables to the printing device 104 that depend in part on the communicative connection of the printing device 104 in these different ways.

The system 100 can include a removable storage device 110 as well. The removable storage device 110 may be a USB storage device, such as a portable hard disk drive or solid-state flash drive, or another type of removable storage device 110. The removable storage device 110 may be directly connected to the user device 102 for storage of files, such as custom color tables, thereon by the user device 102. The removable storage device 110 may then be disconnected from the user device 102 and directly connected to the printing device 104 to transfer (i.e., load) the files onto the printing device 104.

FIG. 2 shows an example process 200 for direct deployment of a digitally signed custom color table from the user device 102 to the printing device 104. The deployment of the digitally signed custom color table is therefore indirect from the perspective of the computing device 106. The left parts of the process 200 are performed by the printing device 104; the middle parts are performed by the user device 102; and the right parts are performed by the computing device 106. The process 200 may be implemented as program code stored on a non-transitory computer-readable data storage medium and executed by a processor of a respective device. For example, the middle parts of the process 200 may be implemented as program code executed by a processor of the user device 102.

A custom color table for the printing device 104 is constructed at the user device 102 (202). For example, the user of the user device 102 may communicatively connect the user device 102 to the printing device 104 to iteratively develop a custom color table to the satisfaction of a customer of the printing service provider that operates the printing device 104. The user of the user device 102, as noted, is an authorized user of the manufacturer of the printing device 104. Therefore, the user can use the user device 102 to log onto the computing device 106 over the network 108 and transmit the finally constructed custom color table to the computing device 106 (204), which receives the custom color table (206).

Because the user of the user device 102 is authorized, the computing device 106 digitally signs the received custom color table with a private cryptographic key of the manufacturer (208). The private key does not therefore have to be, and may thus never be, exposed outside of the computing device 106. That is, the private key is not revealed to the user device 102 nor to the printing device 104. As such, the security of the private cryptographic key is not subject to compromise in this manner.

The computing device 106 transmits the digitally signed custom color table over the network 108 to the user device 102 (210), which accordingly receives the digitally signed custom color table (212). The computing device 106 in turn transmits the digitally signed custom color table over the same or different network 108 to the printing device 104 (214). Therefore, the printing device 104 receives the digitally signed custom color table (216) directly from the user device 102 in the example process 200, as opposed to directly from the computing device 106.

The printing device 104 can authenticate the digitally signed custom color table (218) using the public cryptographic key of the manufacturer that corresponds to the private cryptographic key used to sign the table. Upon successful such authentication, the printing device 104 can then use the digitally signed custom color table during subsequent printing (220), or other processing. In the example process 200, the digitally signed custom color table is thus directly deployed to the printing device 104 by the user device 102, without interaction between the printing device 104 and the computing device 106. The digital signing of the table permits its usage in the case where the printing device 104 has been configure to not permit the loading of unsigned tables and other files for security purposes.

FIG. 3 shows another example process 300 for direct deployment of a digitally signed custom color table from the user device 102 to the printing device 104. The deployment of the digitally signed custom color table is indirect from the perspective of the computing device 106. The left parts of the process 300 are performed by the printing device 104; the middle parts are performed by the user device 102; and the right parts are performed by the computing device 106. Like the process 200, the process 300 may be implemented as program code stored on a non-transitory computer-readable data storage medium and executed by a processor of a respective device.

A custom color table for the printing device 104 is constructed at the user device 102 (302), as has been described. The user device 102 transmits, as before, the constructed custom color table over the network 108 to the computing device 106 (304), which accordingly receives the custom color table (306). The computing device 106 again digitally signs the received custom color table (308), and transmits the digitally signed custom color table over the network 108 to the user device 102 (310). The user device 102 therefore receives the digitally signed custom color table from the computing device 106 (312).

In the example process 300, however, the user device 102 stores the digitally signed custom color table on the removable storage device 110 (314) that has been directly connected to the user device 102. The removable storage device 110 is disconnected from the user device 102 and directly connected to the printing device (315), permitting the printing device 104 to retrieve the digitally signed custom color table from the removable storage device (316). The printing device 104 thus receives the digitally signed color custom color table from the user device 102 via an intervening removable storage device 110 in the example.

The printing device 104 can authenticate the digitally signed custom color table as before (318). Upon successful such authentication, the printing device 104 then can use the digitally signed custom color table during subsequent printing (320), or other processing. In the example process 300, the digitally signed custom color table is again directly deployed to the printing device 104 by the user device 102 (specifically via the removable storage device 110), and is not directly deployed by the computing device 106.

FIG. 4 shows an example process 400 for direct deployment of a digitally signed custom color table from the computing device 106 to the printing device 104. The deployment of the digitally signed custom color table is therefore indirect form the perspective of the user device 102. The left parts of the process 400 are performed by the printing device 104; the middle parts are performed by the user device 102; and the right parts are performed by the computing device 106. Like the processes 200 and 300, the process 400 may be implemented as program code stored on a non-transitory computer-readable data storage medium and executed by a processor of a respective device.

A custom color table for the printing device 104 is constructed at the user device 102 (402), as has been described. The user device 102 also transmits as before the constructed custom color table over the network 108 to the computing device 106 (404), which accordingly receives the custom color table (406). The computing device 106 digitally signs the received custom color table (408), but may not transmit the signed table to the printing device 104 in the process 400, in contradistinction to the processes 200 and 300 that have been described.

Rather, the user of the user device 102 may request that the computing device 106 deploy the custom color table to the printing device 104 (410), via communication of a request form the user device 102 to the computing device 106 over the network 108. For instance, the printing device 104 may be responsible for managing a number of printing devices including the printing device 104. The user of the user device 102 may be authorized to deploy custom color tables on a subset of these printing devices that includes the printing device 104. Therefore, the user can select at which printing devices the custom color table constructed at the user device 102 for the printing device 104 should be deployed.

The computing device 106 receives the request (412), and transmits the digitally signed custom color table over the network 108 to the printing device 104 (414). The computing device 106 may be in continuous or periodic communication with the printing device 104 over the network 108. As part of such communication, the computing device 106 can therefore push the requested digitally signed custom color table to the printing device 104 for deployment at the printing device 104. The printing device 104 thus receives the digitally signed custom color table (416) directly from the computing device 106 in the example, as opposed to directly from the user device 102.

The printing device 104 can authenticate the digitally signed custom color table as before (418). Upon successful such authentication, the printing device 104 then can use the digitally signed custom color table during subsequent printing (420), or other processing. In the example process 400, the digitally signed custom color table is therefore directly deployed to the printing device 104 by the computing device 106, as opposed to by the user device 102.

In environments in which the printing device 104 is in continuous or periodic communication with the computing device 106 over the network 108, the direct deployment of the digitally signed custom color table by the computing device 106 to the printing device 104 can provide for other functionality as well. For example, custom color tables may not be able to be loaded onto the printing device 104 except via the computing device 106. That is, the user device 102 may not be able to directly load custom color tables onto the printing device 104 as in the processes 200 and 300. Therefore, additional security is provided: even if the private cryptographic key of the manufacture becomes compromised, the printing device 104 is unable to load custom color tables nefariously signed using the private key unless they originate from the computing device 106.

Moreover, the ability of load custom color tables can be controlled by the manufacturer of the computing device 106. For example, the loading and/or usage of custom color tables may be predicated on the installation and usage of manufacturer-approved consumable items, such as toner and inkjet cartridges, within the printing device 104. If unapproved consumable items are erroneously installed, their usage may be time limited. The loading of custom color tables may be a feature that is permitted so long as the printing service provider of the printing device 104 has a maintenance agreement or service contract in place with the manufacturer, or be predicated on the printing device 104 providing analytical operational usage data to the computing device 106.

FIG. 5 shows an example non-transitory computer-readable data storage medium 500 storing program code 502 executable by the user device 102 to perform processing. The processing includes constructing a custom color table for the printing device 104 or other imaging device (504), and transmitting the custom color table to the computing device 106 (506). The computing device 106 then digitally signs the custom color table. The processing includes deploying the digitally signed custom color table to the printing device 104 or other imaging device (508), such as directly per the processes 200 and 300 that have been described or indirectly per the process 400 that has been described. The printing device 104 or other imaging device then uses the digitally signed custom color table when printing or performing other processing, such as scanning or copying.

FIG. 6 shows an example method 600 performed by the computing device 106. The method 600 includes receiving, from the user device 102, a custom color table for the printing device 104 or other imaging device that was constructed at the user device 102 (602). The method 600 includes digitally signing the custom color table (604), and deploying the digitally signed custom color table to the printing device 104 or other imaging device (606). The deployment may be indirect per the processes 200 and 300 that have been described or direct per the process 400 that has been described. The printing device 104 or other imaging device then uses the digitally signed custom color table when printing or performing other processing, such as scanning or copying.

FIG. 7 shows a block diagram of the example imaging device 700. The imaging device 700 includes imaging hardware 702. The imaging hardware 702 may include print hardware to print images onto media such as paper. For example, the print hardware may be inkjet-printing hardware or laser-printing hardware to print images onto media using ink or toner, respectively. The imaging hardware 702 may instead or addition include scanning hardware to scan images. The imaging device 700 includes a processor 704, and a memory 706 storing instructions 708 executable by the processor 704.

The instructions 708 are executable by the processor 704 to receive a custom color table constructed at the user device 102 and digitally signed by the computing device 106, from either a removable storage device 110 connected to the imaging device 700, from the user device 102, or from the computing device 106 (710). The custom color table is thus deployed directly by the user device 102 and indirectly by the computing device 106, or deployed directly by the computing device 106 and indirectly by the user device 102. The instructions 708 are executable by the processor 704 to then cause the imaging hardware 702 to process an image using the custom color table (712).

Techniques have been described for deploying digitally signed custom color tables to printing devices and other imaging devices. Via digital signature of such custom color tables, heightened security of the imaging devices can be maintained. Furthermore, where the imaging devices are communicatively connected to the computing device at which the custom color tables are digitally signed and from which the tables are directly deployed, the usage of the color tables at the imaging devices can be more granularly controlled.

We claim:

1. A non-transitory computer-readable data storage medium storing program code executable by a user device to perform processing comprising:
   constructing a custom color table for an imaging device;
   transmitting the custom color table to a computing device, the computing device digitally signing the custom color table; and
   deploying the digitally signed custom color table to the imaging device, the imaging device using the digitally signed custom color table when processing an image.

2. The non-transitory computer-readable data storage medium of claim 1, wherein deploying the digitally signed custom color table to the imaging device comprises:
   receiving the digitally signed custom color table from the computing device; and
   directly deploying the digitally signed custom color table to the imaging device without interaction between the imaging device and the computing device.

3. The non-transitory computer-readable data storage medium of claim 2, wherein directly deploying the digitally signed custom color table to the imaging device comprises:
   transmitting the digitally signed custom color table to the imaging device.

4. The non-transitory computer-readable data storage medium of claim 2, wherein directly deploying the digitally signed custom color table to the imaging device comprises:
   storing the digitally signed custom color table on a removable storage device connected to the user device, a user of the user device subsequently disconnecting the removable storage device from the user device and connecting the removable storage device to the imaging device for loading of the digitally signed custom color table from the removable storage device to the imaging device.

5. The non-transitory computer-readable data storage medium of claim 1, wherein deploying the digitally signed custom color table to the imaging device comprises:
   indirectly deploying the digitally signed custom color table to the imaging device.

6. The non-transitory computer-readable data storage medium of claim 5, wherein indirectly deploying the digitally signed custom color table to the imaging device comprises:
   causing the computing device to transmit the digitally signed custom color table to the imaging device.

7. The non-transitory computer-readable data storage medium of claim 1, wherein the imaging device comprises a printing device, and the processing comprises printing the image.

8. The non-transitory computer-readable data storage medium of claim 1, wherein the imaging device comprises a scanning device, and the processing comprises scanning the image.

9. A method comprising:
   receiving, by a computing device from a user device, a custom color table for an imaging device constructed at the user device;
   digitally signing, by the computing device, the custom color table; and
   deploying the digitally signed custom color table to the imaging device, the imaging device using the digitally signed custom color table when processing an image.

10. The method of claim 9, wherein deploying the digitally signed custom color table to the imaging device comprises:
    indirectly deploying, by the computing device, the digitally signed custom color table to the imaging device without interaction between the imaging device and the computing device.

11. The method of claim 10, wherein indirectly deploying the digitally signed custom color table to the imaging device comprises:
    transmitting the digitally signed custom color table from the computing device to the user device, the user device directly deploying the digitally signed custom color table to the imaging device.

12. The method of claim 9, wherein deploying the digitally signed custom color table to the imaging device comprises:
    directly deploying, by the computing device, the digitally signed custom color table to the imaging device.

13. The method of claim 12, wherein directly deploying the digitally signed custom color table to the imaging device comprises:
    transmitting, by the computing device, the digitally signed custom color table to the imaging device.

14. The method of claim 9, wherein the processing comprises printing or scanning the image.

15. An imaging device comprising:
imaging hardware;
a processor; and
a memory storing instructions executable by the processor to:
- receive, from a removable storage device connected to the imaging device, from a user device, or from a computing device, a custom color table constructed at the user device and digitally signed by the computing device; and
- cause the imaging hardware to process an image using the custom color table.

16. The imaging device of claim 15, wherein the processor is to receive the custom color table from the removable storage device connected to the imaging device.

17. The imaging device of claim 15, wherein the processor is to receive the custom color table from the user device at which the custom color table was constructed.

18. The imaging device of claim 15, wherein the processor is to receive the custom color table from the computing device that digitally signed the custom color table.

19. The imaging device of claim 15, wherein the imaging hardware comprises print hardware, and the processing comprises printing the image.

20. The imaging device of claim 15, wherein the imaging hardware comprises scanning hardware, and the processing comprises scanning the image.

* * * * *